US009982917B2

(12) United States Patent
Rivera

(10) Patent No.: US 9,982,917 B2
(45) Date of Patent: May 29, 2018

(54) SOLAR RACKING SYSTEM ADAPTED FOR SUSPENDED BALLASTING

(71) Applicant: Angel M. Rivera, Newburgh, NY (US)

(72) Inventor: Angel M. Rivera, Newburgh, NY (US)

(73) Assignee: Solar Mounting Solutions, LLC, Newburgh, NY (US)

( * ) Notice: Subject to any disclaimer, the term of this patent is extended or adjusted under 35 U.S.C. 154(b) by 0 days. days.

(21) Appl. No.: 15/614,584

(22) Filed: Jun. 5, 2017

(65) Prior Publication Data
US 2017/0350622 A1 Dec. 7, 2017

Related U.S. Application Data

(60) Provisional application No. 62/345,865, filed on Jun. 6, 2016.

(51) Int. Cl.
E04D 13/18 (2018.01)
F24J 2/52 (2006.01)
H02S 20/23 (2014.01)
H02S 40/44 (2014.01)
E04H 14/00 (2006.01)
F24J 2/00 (2014.01)
F24J 2/54 (2006.01)

(52) U.S. Cl.
CPC ............. F24J 2/523 (2013.01); F24J 2/5207 (2013.01); F24J 2/5211 (2013.01); F24J 2/5258 (2013.01); H02S 20/23 (2014.12); H02S 40/44 (2014.12); E04H 14/00 (2013.01); F24J 2002/0092 (2013.01); F24J 2002/5486 (2013.01)

(58) Field of Classification Search
CPC .......... F24J 2/523; F24J 2/5207; F24J 2/5258; F24J 2/5211; F24J 2002/0092; F24J 2002/5486; H02S 20/23; H02S 40/44; E04H 14/00
USPC ...... 52/20, 222, 173.3, 251, 586.1; 136/244, 136/251, 291
See application file for complete search history.

(56) References Cited

U.S. PATENT DOCUMENTS 4,378,006 A * 3/1983 Hawley ................. F24J 2/5237
126/569
5,687,538 A * 11/1997 Frobosilo ................ E04B 5/10
52/100
6,105,316 A * 8/2000 Bottger ................. F24J 2/5237
126/623

(Continued)

OTHER PUBLICATIONS

Kelly Pickerel, Apr. 7, 2016, What's up with solar ballast?, http://www.solarpowerworldonline.com/2016/04/whats-solar-ballast/.

Primary Examiner — Basil Katcheves
Assistant Examiner — Joshua Ihezie
(74) Attorney, Agent, or Firm — Tracy Jong Law Firm; Tracy P. Jong; Cheng Ning Jong

(57) ABSTRACT

A solar rack for supporting a solar panel, said solar rack including a pair of support frames, each support frame including a front member, a bottom member, and a rear member, wherein the front member, the bottom member, and the rear member cooperate to form a triangularly shaped structure; and a trough including two ends and a base, each end of the trough is configured to be attached to a portion of each of the support frames to form a support upon which the solar panel is disposed, the support having bottom surfaces, wherein the base of the trough is configured to be offset with respect to the bottom surfaces of the support.

12 Claims, 15 Drawing Sheets

(56) References Cited

U.S. PATENT DOCUMENTS

| | | | | |
|---|---|---|---|---|
| 6,968,654 B2* | 11/2005 | Moulder | F24J 2/464 | 126/623 |
| 7,780,472 B2* | 8/2010 | Lenox | F24J 2/5211 | 136/251 |
| 7,814,899 B1* | 10/2010 | Port | F24J 2/5211 | 126/571 |
| 7,849,849 B2* | 12/2010 | Genschorek | F24J 2/5233 | 126/704 |
| 7,921,843 B1* | 4/2011 | Rawlings | F24J 2/5235 | 126/623 |
| 8,272,176 B2* | 9/2012 | Wallgren | F24J 2/5233 | 126/623 |
| 8,276,330 B2* | 10/2012 | Harberts | F24J 2/5239 | 136/244 |
| 8,281,524 B2* | 10/2012 | Hund | F24J 2/5237 | 248/175 |
| 8,307,606 B1* | 11/2012 | Rego | H01L 31/05 | 126/621 |
| 8,316,619 B1* | 11/2012 | Rego | H01L 31/05 | 126/621 |
| 8,475,185 B2 | 7/2013 | Rivera et al. | | |
| 8,567,132 B2* | 10/2013 | Rothschild | F24J 2/5237 | 136/244 |
| 8,572,909 B2* | 11/2013 | Rivera | F24J 2/4638 | 136/251 |
| 8,661,748 B2* | 3/2014 | Lewenz | F24J 2/5235 | 52/173.3 |
| 8,726,897 B2* | 5/2014 | Wallgren | F24J 2/4638 | 126/571 |
| 8,740,163 B1* | 6/2014 | Taylor | F24J 2/5258 | 248/226.12 |
| 9,038,329 B2* | 5/2015 | Pelman | F24J 2/5233 | 136/244 |
| 9,093,948 B2* | 7/2015 | Walz | H02S 20/24 | |
| 9,130,089 B2* | 9/2015 | Bindschedler | F24J 2/5203 | |
| 9,142,700 B2* | 9/2015 | Meine | F24J 2/52 | |
| 9,249,925 B2* | 2/2016 | Roensch | H01L 31/042 | |
| 2007/0144575 A1* | 6/2007 | Mascolo | F24J 2/4636 | 136/246 |
| 2008/0210221 A1* | 9/2008 | Genschorek | F24J 2/5233 | 126/704 |
| 2011/0070765 A1* | 3/2011 | Kobayashi | F24J 2/5207 | 439/387 |
| 2012/0036799 A1* | 2/2012 | Kneip | F24J 2/523 | 52/173.3 |
| 2012/0048345 A1* | 3/2012 | Wood | F24J 2/4614 | 136/251 |
| 2012/0186169 A1* | 7/2012 | Tomaso | F24J 2/5233 | 52/173.3 |
| 2012/0186632 A1* | 7/2012 | Reinhold | F24J 2/4638 | 136/251 |
| 2012/0240489 A1* | 9/2012 | Rivera | F24J 2/4638 | 52/173.3 |
| 2012/0279150 A1* | 11/2012 | Pisklak | H01L 31/05 | 52/173.3 |
| 2013/0298968 A1* | 11/2013 | Laitila | H02S 20/24 | 136/251 |
| 2013/0318893 A1* | 12/2013 | Knapp | F24J 2/5237 | 52/173.3 |
| 2014/0290720 A1* | 10/2014 | Hockaday | H02S 20/30 | 136/251 |
| 2015/0040967 A1* | 2/2015 | West | F24J 2/5247 | 136/251 |
| 2015/0101654 A1* | 4/2015 | Pantel | F16M 13/02 | 136/251 |
| 2015/0171786 A1* | 6/2015 | Worden | H02S 20/10 | 136/251 |
| 2015/0349700 A1* | 12/2015 | Port | H02S 20/22 | 52/173.3 |

* cited by examiner

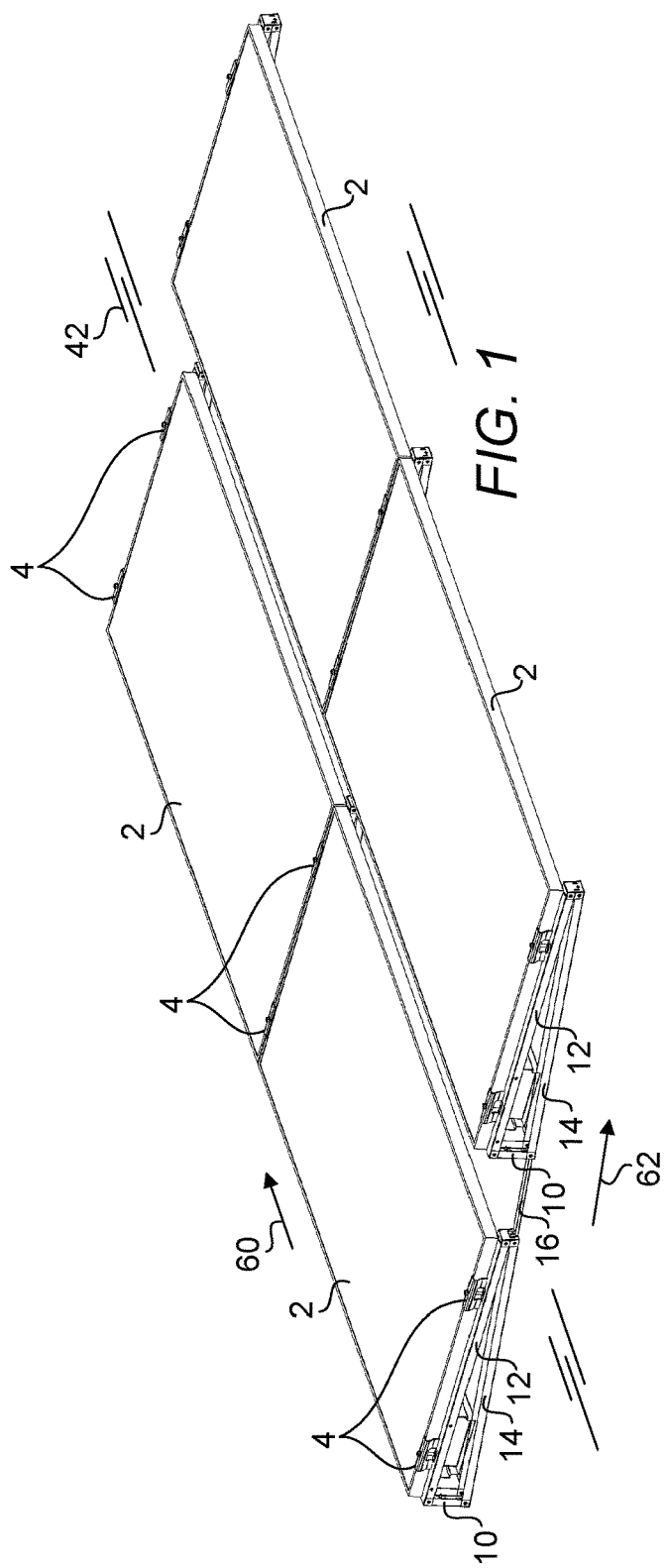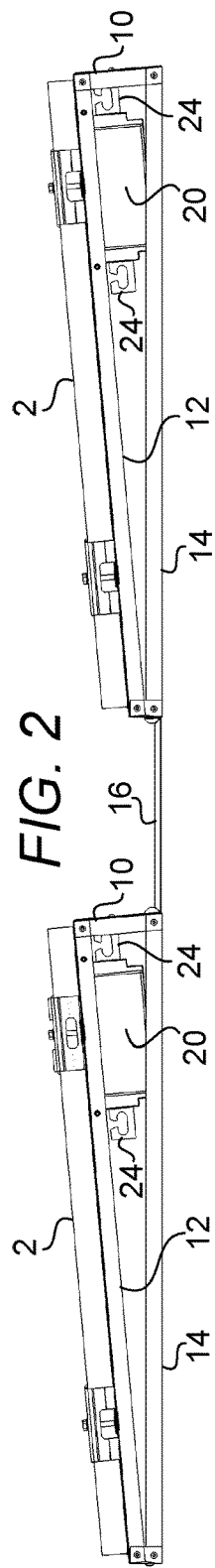

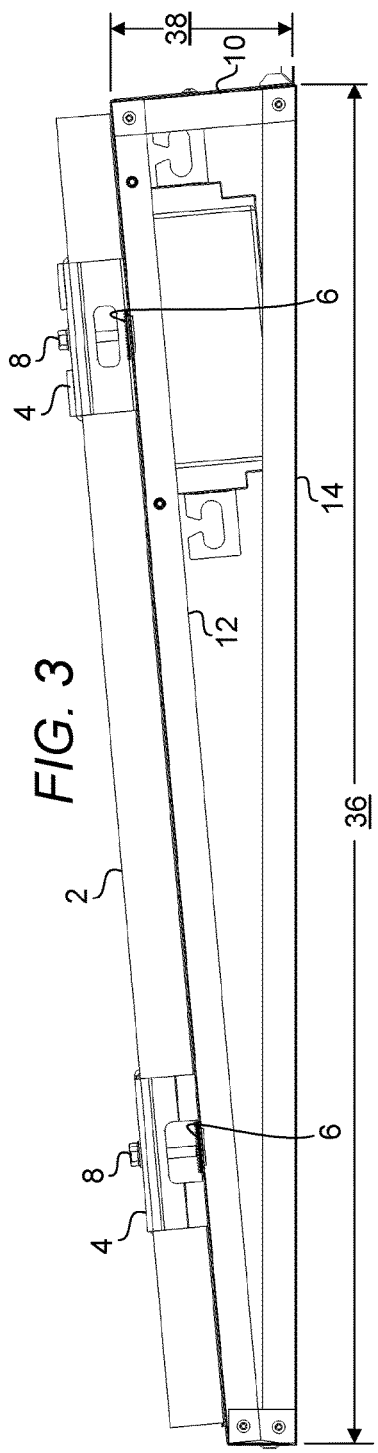
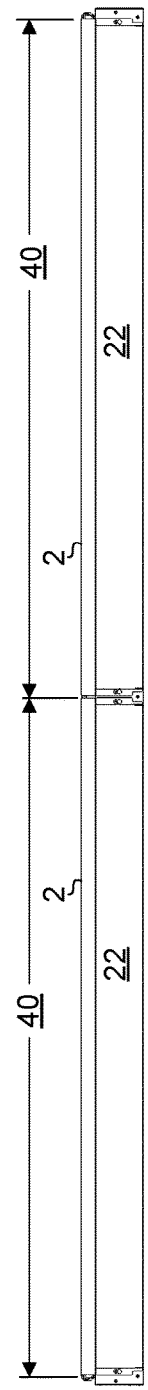
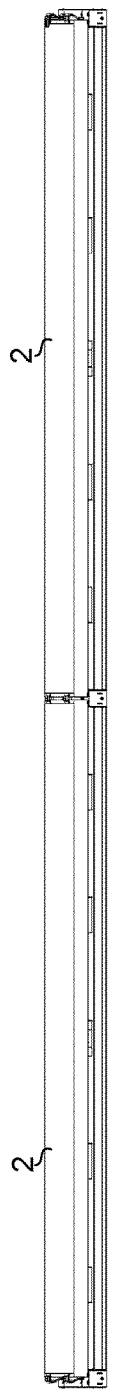
FIG. 3
FIG. 4
FIG. 5

SOLAR RACKING SYSTEM ADAPTED FOR SUSPENDED BALLASTING

PRIORITY CLAIM AND RELATED APPLICATIONS

This non-provisional application claims the benefit of priority from application U.S. Ser. No. 62/345,865 filed on Jun. 6, 2016. Said application is incorporated by reference in its entirety.

BACKGROUND OF THE INVENTION

1. The Field of the Invention

The present invention is directed generally to a racking system for securing solar panels, and in particular, to a racking system for securing solar panels disposed on a flat roof.

2. Background Art

Recent advancements in solar cell technology and skyrocketing fossil fuel prices coupled with awareness of environmental impacts have prompted many businesses to consider solar energy as an alternative energy source. Many commercial buildings have flat roofs and most are left unused. These large expanses of flat spaces present ideal opportunities to place solar panels as they are typically not publicly accessible and free from significant natural debris such as leaves or shade cast by trees or buildings.

As labor costs are high and constitute a large portion of the total cost of solar equipment procurement and installation, it is imperative that installers resort to solar racking systems having a grounding system that is simple to install, one that does not require highly trained professionals to be present at all times. For example, installation costs can be reduced if the electrician is only required to be present when solar panels are ready to be electrically enabled.

Solar panels and their supporting framework must be designed to be wind resistant. At least one prior art system has incorporated wind deflectors while another prior art system uses slides in the panel support structures to accommodate high wind velocities. As building owners require solar racking systems to be disposed independently on flat roofs, e.g., without breaching the flat roofs for the benefit of securing the solar racking systems to them, it is critical to have the solar racks assume as low a profile as possible to avoid wind and other environmental concerns.

Given these concerns, several solar panel support systems have been designed to solve some of these problems. However, none of the prior art systems are designed to be capable of addressing all of these concerns.

U.S. Pat. No. 8,661,748 to Lewenz et al. (Hereinafter Lewenz) discloses a light weight ballasted solar racking system having light ballasted weight loads that is easy and fast to install. The racking system may be used in roof or ground mount applications to mount thin film and frameless solar modules. The racking system physically attaches to the solar panel at the manufactured mounting holes with a set of struts that then attach to a ballast tray that holds the system in place. A set of struts may determine the degree of angle from about 5 to about 35 degrees, for example. The front of the ballast tray has an air pass way of about 3-5 inches, while the back of the system has about 8-12 inches of space for an air pass way. Multiple racking systems may be linked together, resulting in the need for less ballast weight for each racking system. Although Lewenz's ballasts are also disposed within the footprint of a racking system (or at least partially protected from outdoor elements), Lewenz's ballasts are supported by materials or plates that span entire lengths and widths of the ballast. This feature is in contrast to the present rack where ballasts are supported by a supporting frame, e.g., wire frame, which requires much less materials for fabrication. As Lewenz's ballasts are not "suspended" or elevated, there lacks air gap between the supporting surfaces and ballasts. Lewenz's ballasts are therefore potentially exposed to moisture for longer periods of time compared to the present rack where air drying can occur readily. Lewenz lacks a sheltered elevated path for supporting cabling.

U.S. Pat. No. 6,105,316 of Bottger et al. (Hereinafter Bottger) discloses a device for supporting one or more solar panels or thermal collectors which may be arrangeable on a flat roof. The device has a bottom wall, a rear wall which extends upwardly from a rear side of the bottom wall, and two oppositely arranged side walls which are integrally joined with side edges of the bottom wall and rear wall. The side walls slope from the rear wall to a front edge of the bottom wall. Again, Bottger's ballasts are at least partially sheltered and rather "enclosed." Again, Bottger's ballasts are disposed over solid continuous materials to weigh down Bottger's device. Bottger also lacks air gap between the supporting surfaces of the ballasts and the ballasts are therefore potentially exposed to moisture for longer periods of time compared to the present rack where air drying can occur readily. Bottger also lacks a sheltered elevated path for supporting cabling.

Kelly Pickerel's article "What's up with solar ballast?" on www.solarpowerworldonline.com/2016/04/whats-solar-ballast/ discloses problems associated with concrete blocks used as ballasts for low-sloped and flatter rooftops. Besides being unsightly, concrete blocks used in conventional ballast practices are unprotected from outdoor elements, severely speeding their degradation. Broken concrete chunks can fall out of racking, rendering the blocks useless as ballasts and increasing the potential of getting roof membranes damaged.

Thus, there arises a need for a solar rack which is simple in construction and installation, one that does not require regular maintenance, one that is compact, one having all components arranged in a manner suitable for a long life span, one that provides for flexible wire management practices, one that provides superior grounding to conventional grounding methods and one that does not require modifications to existing flat roofs on which the racking system is used.

SUMMARY OF THE INVENTION

In accordance with the present invention, disclosed herein is a solar rack for supporting a solar panel, the solar rack includes:
  (a) a pair of support frames, each support frame including a front member, a bottom member, and a rear member, wherein the front member, the bottom member, and the rear member cooperate to form a triangularly shaped structure disposed; and
  (b) a connecting structure including two ends and a base, each end of the connecting structure is configured to be attached to a portion of each support frame to form a support upon which the solar panel is disposed, the support having bottom surfaces, wherein the base of the connecting structure is configured to be offset in height with respect to the bottom surfaces and the base is configured to receive a ballast to further secure the solar rack upon a surface the solar rack is disposed.

In one embodiment, the connecting structure includes a trough. In one embodiment, the connecting structure includes a pair of elongated plates. In one embodiment, the solar rack further includes at least one articulated cable hook. In one embodiment, the at least one articulated cable hook includes at least one embossed edge. In one embodiment, the connecting structure further includes at least one side wall and at least one articulated cable hook is formed on the at least one side wall.

In one embodiment, the solar rack further includes at least one grounding clip, where the at least one grounding clip is configured to electrically connect at least one support frame and the solar panel.

In one embodiment, the solar rack further includes a retaining clip and a stud, wherein the stud having a first end configured to allow tightening of the stud and a second end configured to be removably engaged to one of the support frames such that a solar panel can be securely supported by the pair of support frames when the stud is tightened by twisting the first end of the stud.

One object of the present invention is to provide a solar rack having a ballasting system that is suspended, i.e., one that is elevated and has an air gap that facilitates air flow at its bottom portion.

Another object of the invention is to provide a solar rack having a ballasting system that is sheltered or at least partially protected from direct sun rays, rain, and other environmental impacts, etc.

Another object of the invention is to provide a solar racking system that has a cable management system.

Another object of the invention is to provide a solar racking system that has a cable management system that is articulated, enabling selective use of cable supports.

Another object of the invention is to provide a solar rack that is low profile.

Another object of the invention is to provide a solar rack that is cost effective to manufacture.

Another object of the invention is to provide a solar rack that is maintenance-free.

Another object of the invention is to provide a solar racking system that can be installed without making modifications to a roof top.

Another object of the present invention is to provide a solar racking system where the modularity of the architecture eliminates the customary measuring necessary for installation.

Another object of the present invention is to provide a solar racking system that has a grounding system that does not require use of cables.

Whereas there may be many embodiments of the present invention, each embodiment may meet one or more of the foregoing recited objects in any combination. It is not intended that each embodiment will necessarily meet each objective. Thus, having broadly outlined the more important features of the present invention in order that the detailed description thereof may be better understood, and that the present contribution to the art may be better appreciated, there are, of course, additional features of the present invention that will be described herein and will form a part of the subject matter of this specification.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 1 is a top front perspective view of a solar panel array disposed on a flat roof utilizing the present racking system.

FIG. 2 is a side view of the embodiment shown in FIG. 1.

FIG. 3 is a side close-up partial view of one row of the embodiment shown in FIG. 1, showing installed retaining clips on one side of the solar panel.

FIG. 4 is a rear view of the embodiment shown in FIG. 1.

FIG. 5 is a front view of the embodiment shown in FIG. 1.

Figures 7, 8:
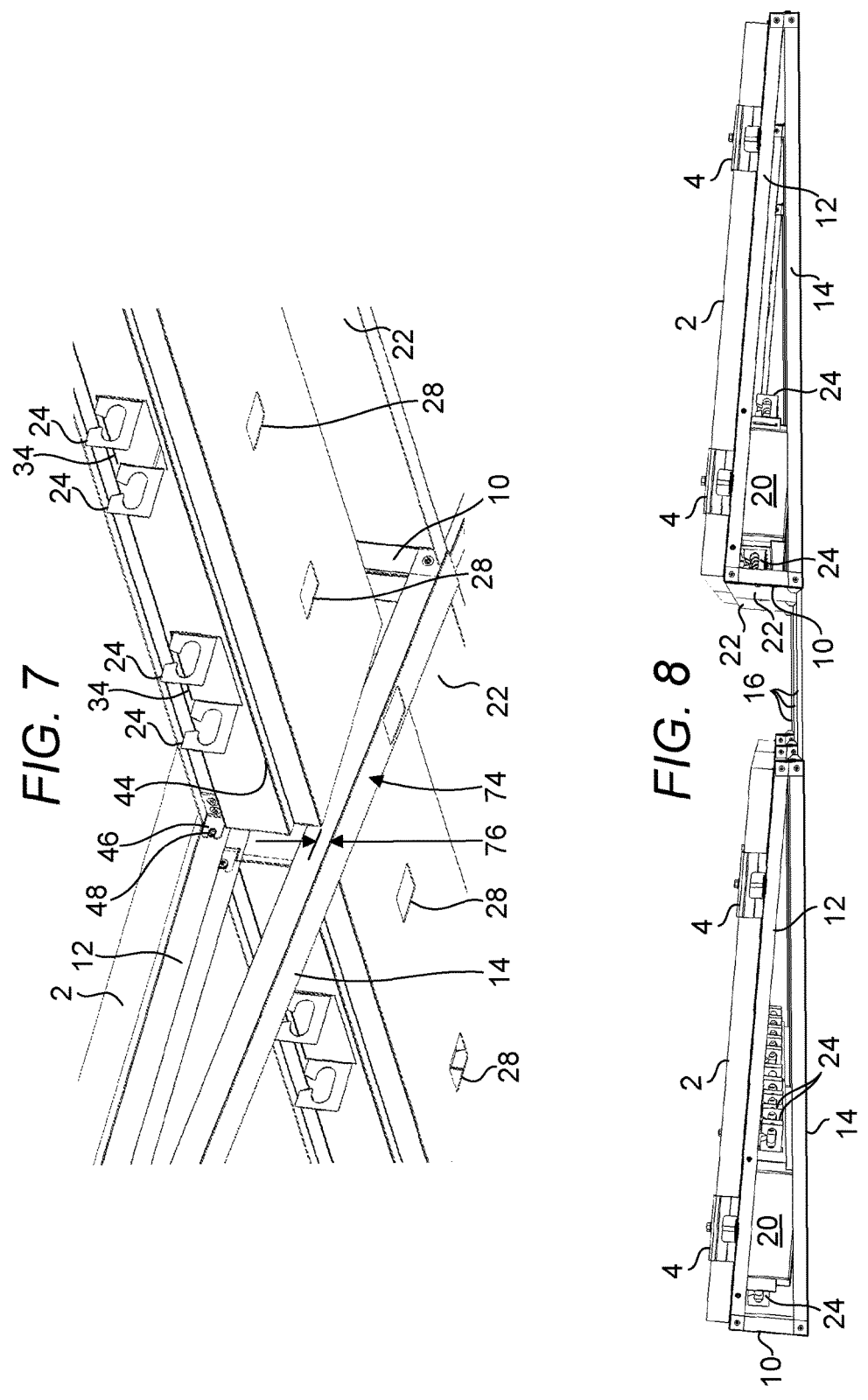

FIG. 7 is a bottom front close-up partial view of formed sheet metal tabs forming cable hooks.

FIG. 8 is a side perspective view of the embodiment shown in FIG. 1 showing cable hooks.

PARTS LIST

Figure 6:
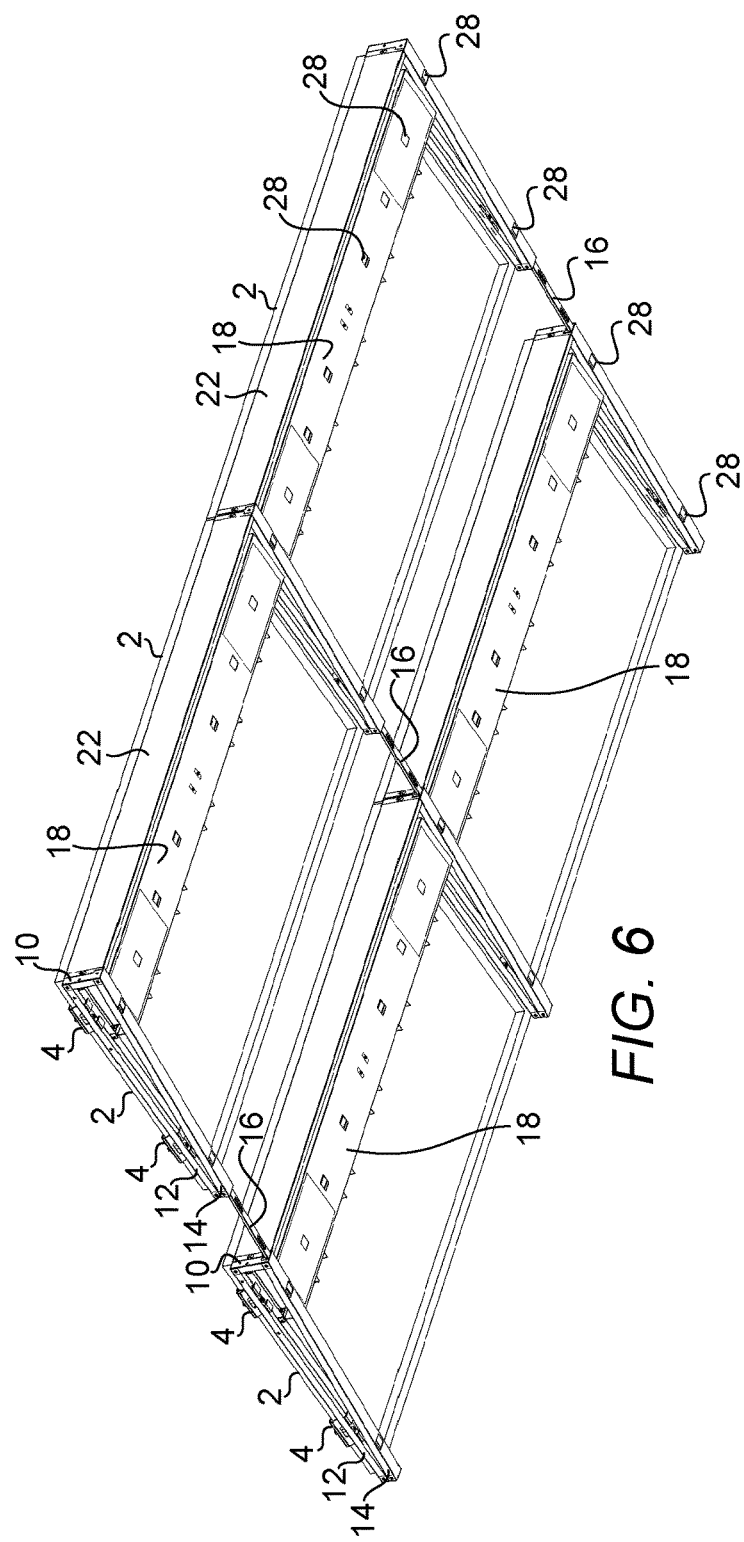
FIG. 6 is a bottom rear perspective view of a solar panel array.

2—solar panel
4—retaining clip
6—grounding clip
8—stud
10—rear member
12—front member
14—bottom member
16—tie member
18—trough and connecting structure
20—ballast
22—wind deflector
24—cable hook
26—embossed edge of cable hook
28—perforation
30—cable
32—slit
34—opening
36—width of support frame
38—height of support frame
40—gap between support frames
42—roof top or flat level surface
44—fold or crease
46—bracket
48—fastener
50—mounting stand
52—electrical component
54—brace
56—bank of teeth
58—folds
60—row direction
62—column direction
64—prong
66—tab
68—direction
70—direction
72—nut
74—base
76—offset
78—support member
80—edge of support member
82—elongated plate

PARTICULAR ADVANTAGES OF THE INVENTION

As the present solar rack is adapted to hold ballasts in suspension, moisture collected in ballasts and on their surfaces can dissipate more readily. Therefore, even if the ballasts are exposed to moisture, e.g., from rainwater of torrential rainstorms, the ballasts will dry quickly as air flow is allowed underneath the trough used to support the ballasts. In addition, exposure of the ballasts to sun rays is minimized as the ballasts are sheltered underneath solar panels. The connecting structure or trough serves multiple purposes as it provides structural integrity to the support frames by being attached on each end to the support frames, holds ballasts in suspension and serves as a base for cable hooks adapted to support and manage cables. As a result, the present solar rack includes a small part count and is economical to manufacture.

A cable management system including a plurality of articulated hooks is provided. The articulated hooks are formed by molding a flat sheet with hook-shaped parts or by stamping a flat sheet with dies which form hook-shaped parts. These hook-shaped parts do not need to be disposed in their in-use condition until such time when they are required. The cable management system can therefore be transported in a more compact format. These hook-shaped parts may be bent on-site on-demand during installation to form supports for cables run underneath solar panels. In one embodiment, the articulated cable hooks are formed as part of a trough for suspending ballasts, thereby removing the need for a separately available cable management system.

Grounding clips are provided to ground support frames and solar panels to replace the use of grounding wires, reducing the number of wires used in a photovoltaic system and easing the management of wires as the number of wires used is significantly reduced.

DETAILED DESCRIPTION OF A PREFERRED EMBODIMENT

The term "about" is used herein to mean approximately, roughly, around, or in the region of. When the term "about" is used in conjunction with a numerical range, it modifies that range by extending the boundaries above and below the numerical values set forth. In general, the term "about" is used herein to modify a numerical value above and below the stated value by a variance of 20 percent up or down (higher or lower).

As used herein, the term "grounding" or "ground" shall be construed to mean electrically grounding ("ground") an object or bonding the object to a ground potential. As used herein, the terms "solar panel" shall be construed to mean a photovoltaic module framed or protected in an electrically conductive frame. As used herein, the term "bonding" means permanently joining to form an electrically conductive path that ensures electrical continuity and that the formed bond has the capacity to safely conduct any current likely to be imposed. As used herein, the terms "solar rack" is used to refer to a pair of support frames, a connecting structure joining the pair of support frames and other necessary hardware to support a solar panel. As used herein, the terms "solar racking system" is used to refer to one or more solar racks that support and secure solar panels of a particular locale.

Disclosed herein is a solar racking system including a plurality of support frames, a plurality of connecting structures or troughs, a plurality of cable hooks, a plurality of grounding clips and a plurality of retaining clips for securing one or more solar panels. Each support frame includes a bottom member connected at one end of the bottom member to a first end of a front member and connected at the other end of the bottom member to a first end of a rear member and the front and rear members are connected at their respective second ends to form a frame disposed in a flat plane. Each pair of consecutively and parallelly-disposed support frames supports a solar panel at the front members of the support frames. Each support frame essentially supports one widthwise edge of two solar panels. At least one connecting structure or trough is provided to connect two support frames. In one embodiment, in addition to its use as a means for supporting ballasts, each trough also includes a path for supporting cables, e.g., electrical cables. In one embodiment, each support frame is triangularly-shaped. The shape of the each support frame may also be referred to as "trapezoid" as there may be a short piece connecting the front and bottom members.

FIG. 1 is a top front perspective view of a solar panel array disposed on a flat roof utilizing the present racking system showing solar panels 2 supported by triangularly shaped support frames where the solar racking system is disposed on a roof top or a flat level surface 42. FIG. 2 is a side view of the embodiment shown in FIG. 1 showing solar panels 2 held in place by grounding and retaining assemblies. FIG. 3 is a side close-up partial view of one row of the embodiment shown in FIG. 1, showing installed retaining clips 4 on one side of the solar panel 2. FIG. 4 is a rear view of the embodiment shown in FIG. 1. FIG. 5 is a front view of the embodiment shown in FIG. 1. FIG. 6 is a bottom rear perspective view of a solar panel array.

For ease of illustration of the present concepts, FIG. 1 is shown with four panels only, although the number of panels is not so limited and the configuration of the resulting racking system and solar panels is not limited to a rectangular format. The panels are said to be disposed in the row direction 60 and column 62 as shown in FIG. 1. Therefore, the panels can be said to be disposed in two rows and two columns. Each support frame includes a bottom member 14 connected at one end of the bottom member 14 to a first end of a front member 12 and connected at the other end of the bottom member 14 to a first end of a rear member 10 and the front and rear members 12, 10 are connected at their respective second ends to form a frame disposed in a flat plane. Suitable bracketing, fastening, welding or other fusing techniques, etc., may be employed to connect these members 10, 12, 14. It shall be noted that each support frame of one row is connected to a support frame of an adjacent row using a tie member 16. In one embodiment, each of the rear, bottom and front members 10, 14, 12 is fabricated from a tube or channel having a rectangular cross-section. In another embodiment, each such member may be constructed from a tube or channel having cross-section of other shapes, e.g., circular, oval or other irregular shapes, provided that the top surface of each front member 12 is constructed with a suitable profile such that grounding clips disposed on such a surface may cause a common electrical grounding between the support frame and a solar panel supported thereupon. In yet another embodiment, each support frame may be constructed from a single flat sheet to form the flat plane and bent to form surfaces upon which solar panels are supported and grounded. In the embodiment shown in FIG. 1, the length of the rear member 10 of the triangular support frame can be modified to provide the optimum inclination angle for absorbing solar energy at a location of given latitude. Referring to FIG. 3, in one example, the present solar rack is configured to provide a racking height 38 that is well under the height of conventional solar racks. In one example, an installed solar panel may add another about 2 inches to the racking height to form a total height of under about 7 inches, suitable for applications that require low profile solar power systems.

In one embodiment, the support frames are connected together with a trough 18 that contains a cable management system. The trough 18 includes perforations 28 to drain moisture from rain and snow that may collect in the trough 18. The length of the trough facilitates installation of the solar panels 2 without the customary time consuming measuring process that may accompany the installation of other conventional solar panel racking systems as discussed elsewhere herein. The length of the trough 18 is easily customizable to accommodate varying solar panel widths from various manufacturers. Suspending ballasts 20 with a trough 18 removes the need for one or more large surfaces, e.g., channel members used as legs, to support ballasts, thereby reducing the overall footprint of the solar rack and the amount of materials in fabrication of the present solar rack. In the embodiment shown, a trough 18 is securable at each widthwise end to a support frame with one or more brackets 46 and fasteners 48. In one embodiment, a trough 18 is further constructed with folds or creases 44 on the side walls of the trough to increase the strength of the trough 18 such that materials of a lower thickness may be used for the construction of the trough 18. In another embodiment, a wire frame construction may be employed to form the trough 18 provided that the wire frame construction is also capable of elevating ballasts to be placed therein. Ballasts 20 may be concrete blocks or any weights capable of surviving outdoor elements without maintenance. The present ballast system is suspended above the roof surface, and eliminates the need to penetrate the roof surface with fasteners in order to hold the racking system in place. The trough also serves as an anchoring surface for mounting stands 50 for supporting necessary electrical components 52 connected to solar panels 2.

Figure 9:
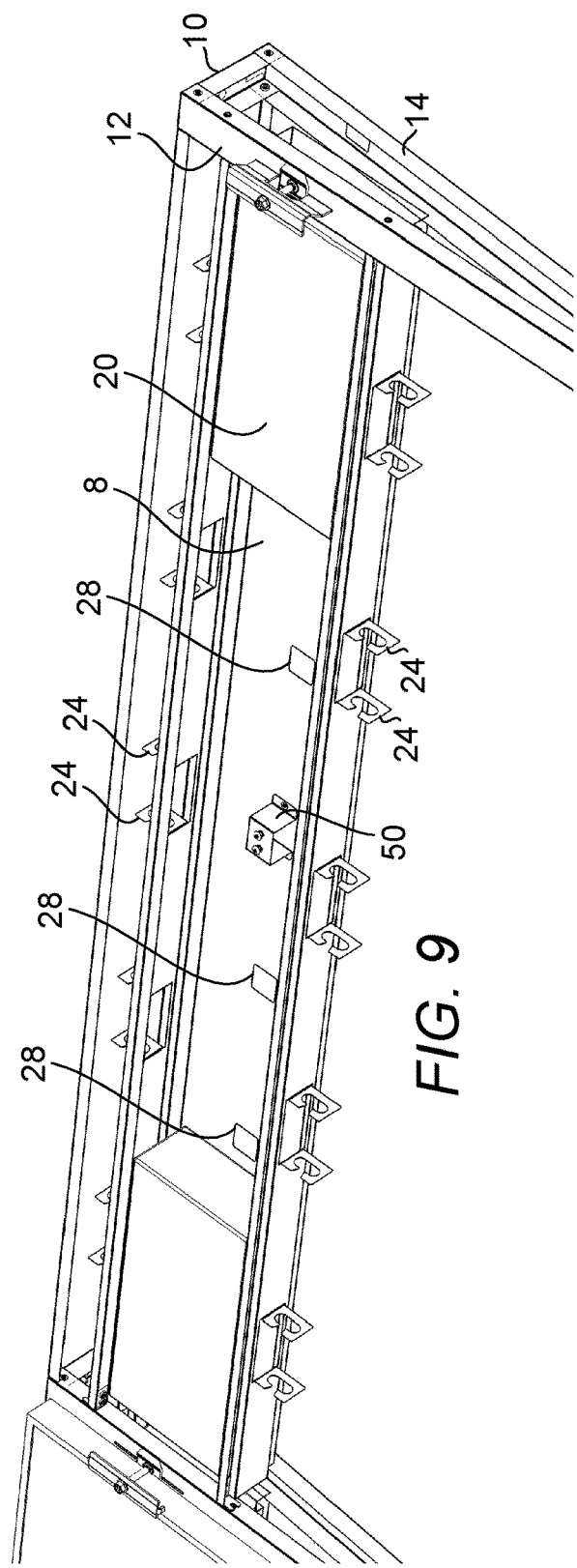
FIG. 9 is a top partial close-up perspective view of the embodiment shown in FIG. 1 showing cable hooks.
Figure 10:
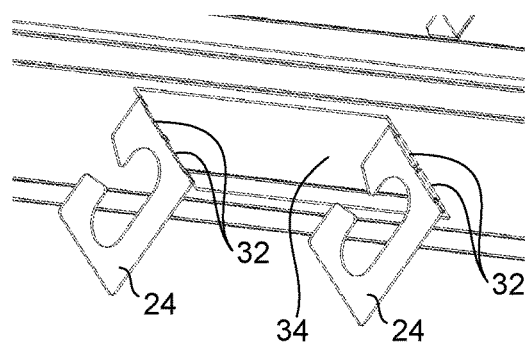
FIG. 10 is a top close-up perspective view of a cable hook assembly in place on the present racking system.
Figure 11:
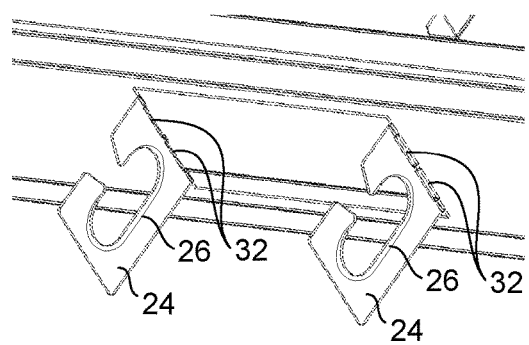
FIG. 11 is a top close-up perspective view of a cable hook showing an embossed edge to protect one or more held cables.
Figure 12:
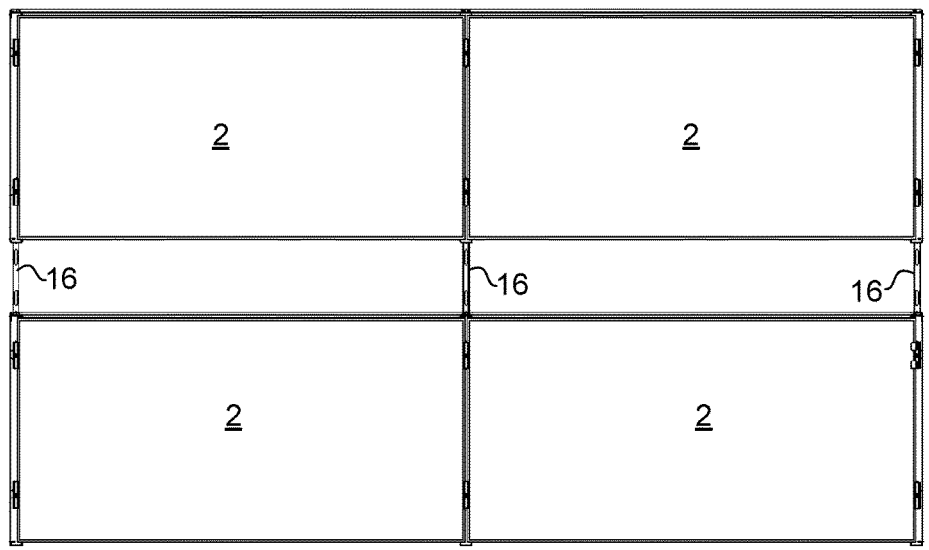
FIG. 12 is a top view of the embodiment shown in FIG. 2.
Figure 13:
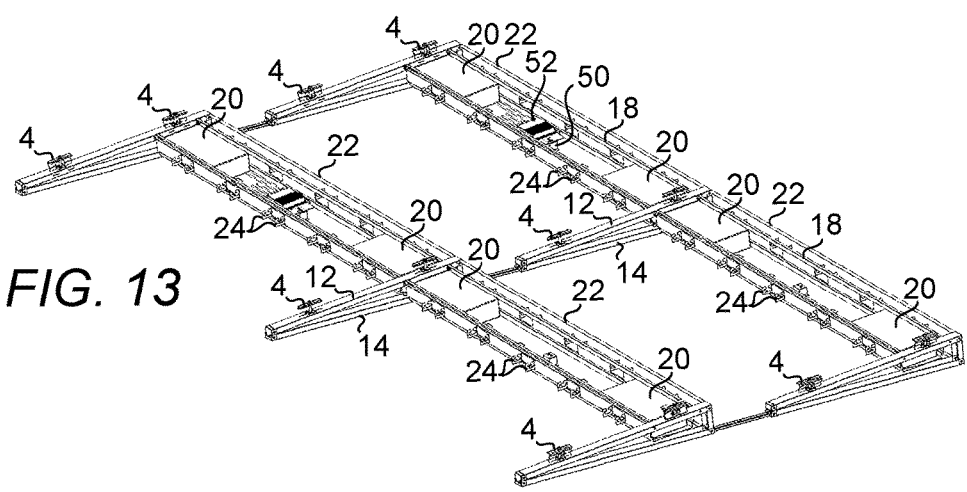
FIG. 13 is a top front perspective view of the present racking system without installed solar panels.
Figure 14:
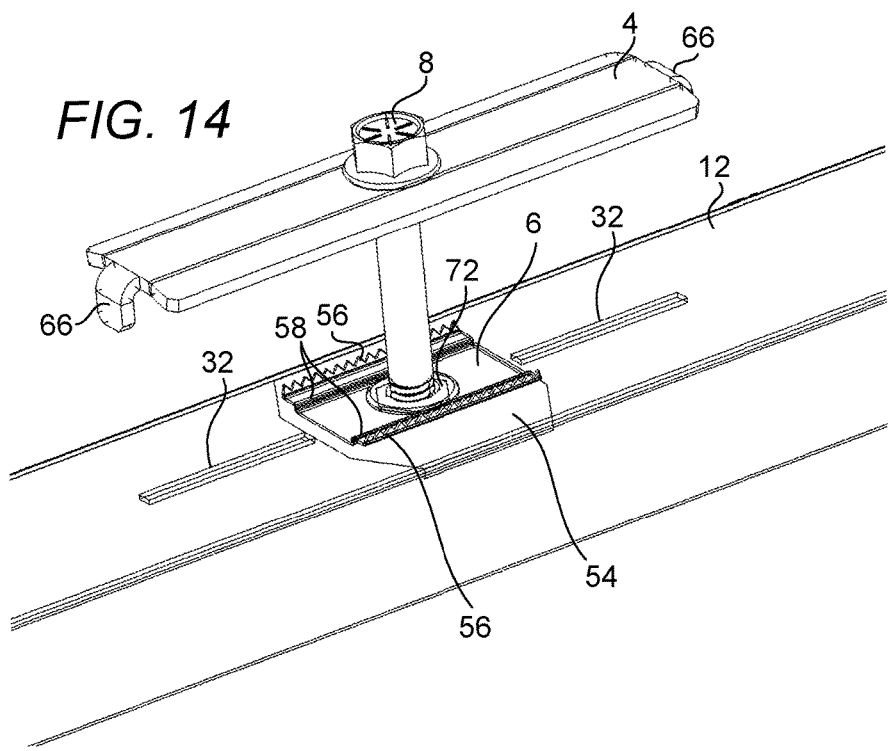
FIG. 14 is a top close-up view of the grounding assembly employing grounding clips.
Figure 15:
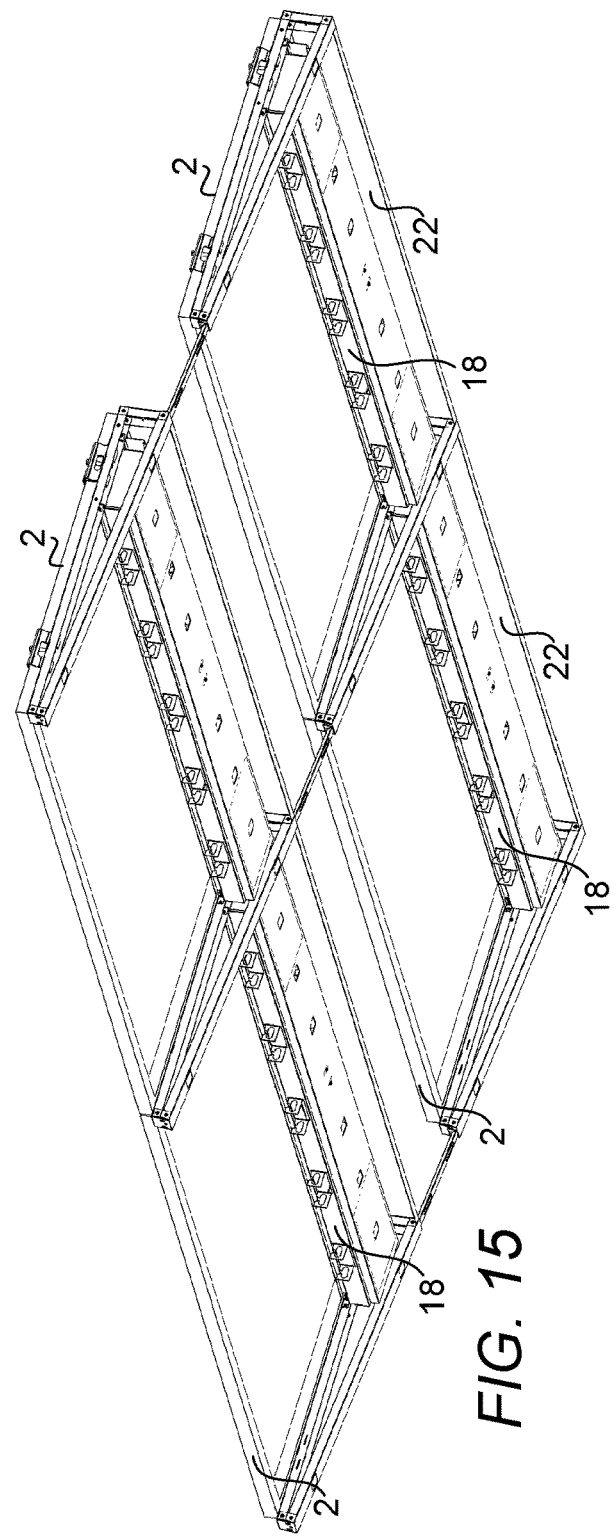
FIG. 15 is a bottom front perspective view of the present racking system.
Figure 16:
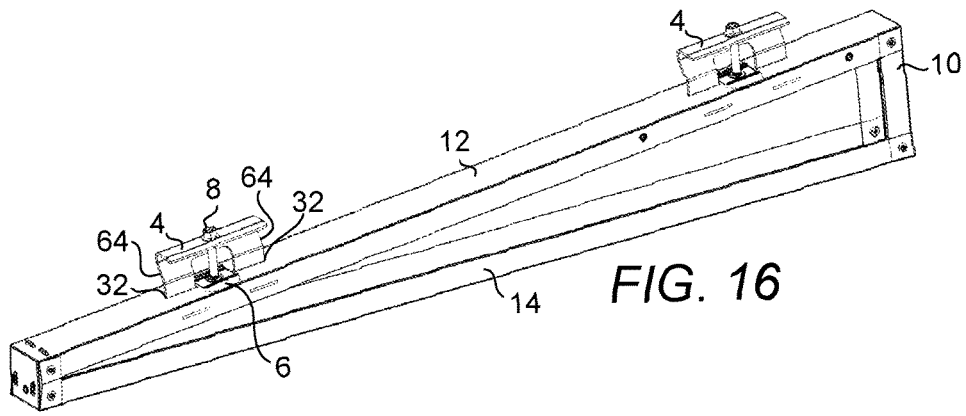
FIG. 16 is a top front side perspective view of a panel support frame according to the present racking system showing grounding and retaining assemblies on an edge of a row of solar panels.
Figure 17:
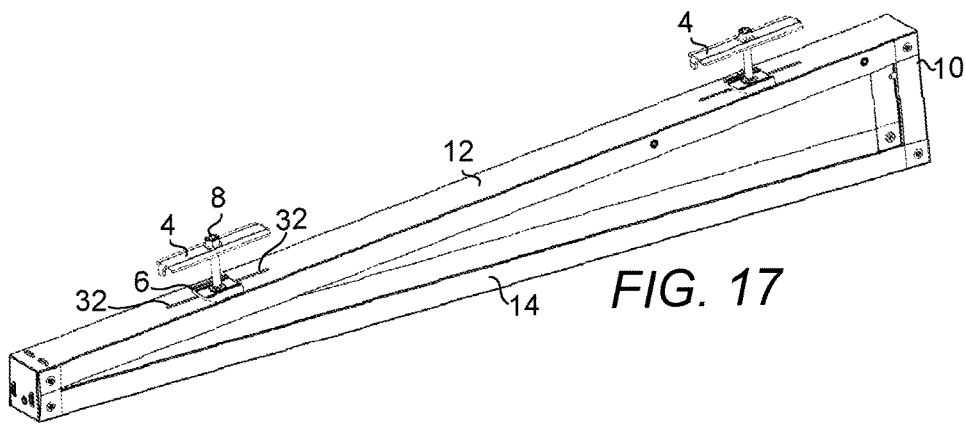
FIG. 17 is a top front side perspective view of a panel support frame according to the present racking system showing grounding and retaining assemblies between two solar panels.
Figure 18:
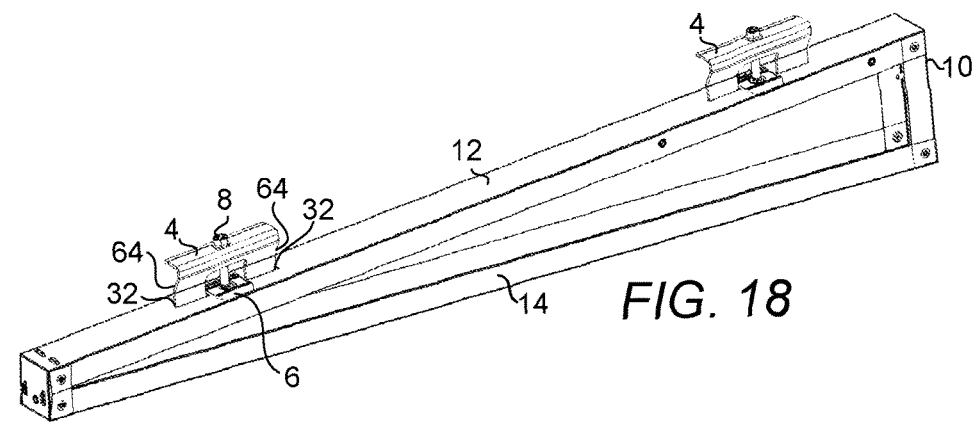
FIG. 18 is a top front side perspective view of a panel support frame according to the present racking system showing grounding assemblies on an opposing edge from the edge shown in FIG. 16.
Figure 19:
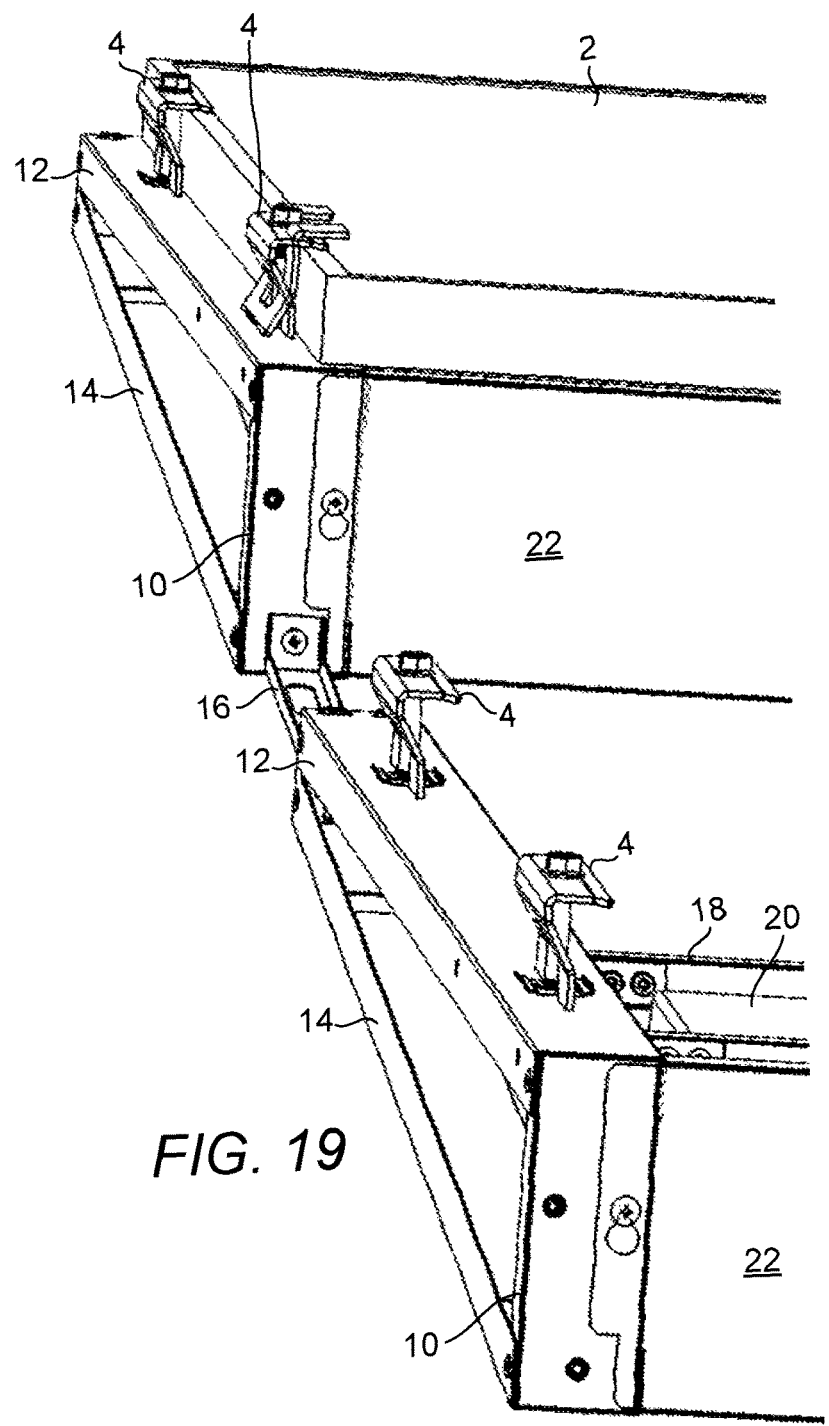
FIG. 19 is a top rear side close-up perspective view of a panel support structure according to the present racking system showing grounding and retaining assemblies in place on a solar panel (upper portion of figure), and without a solar panel (lower portion of figure).
Figure 20:
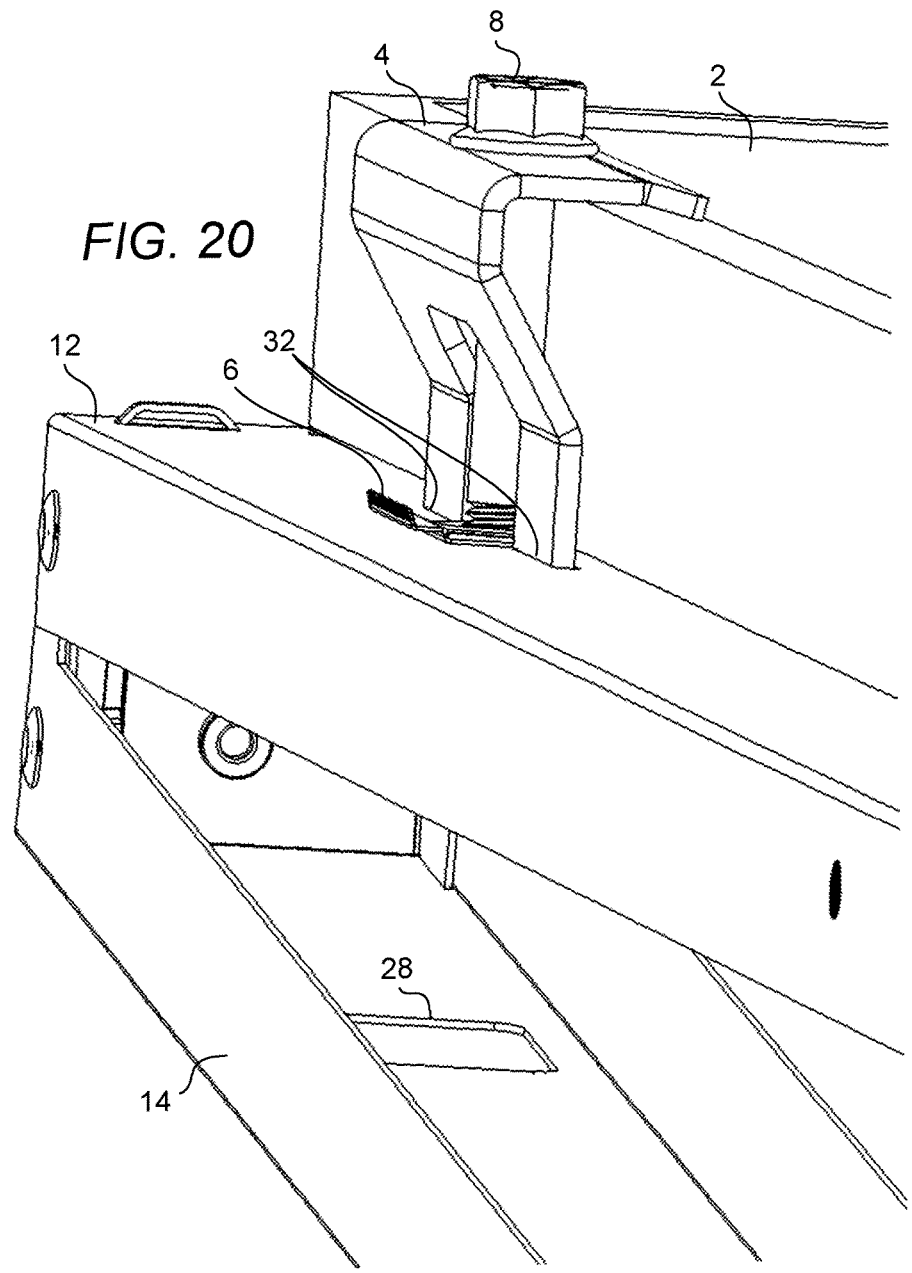
FIG. 20 is a top side close-up perspective view of a grounding and retaining assembly in place on the edge of a solar panel.
Figure 21:
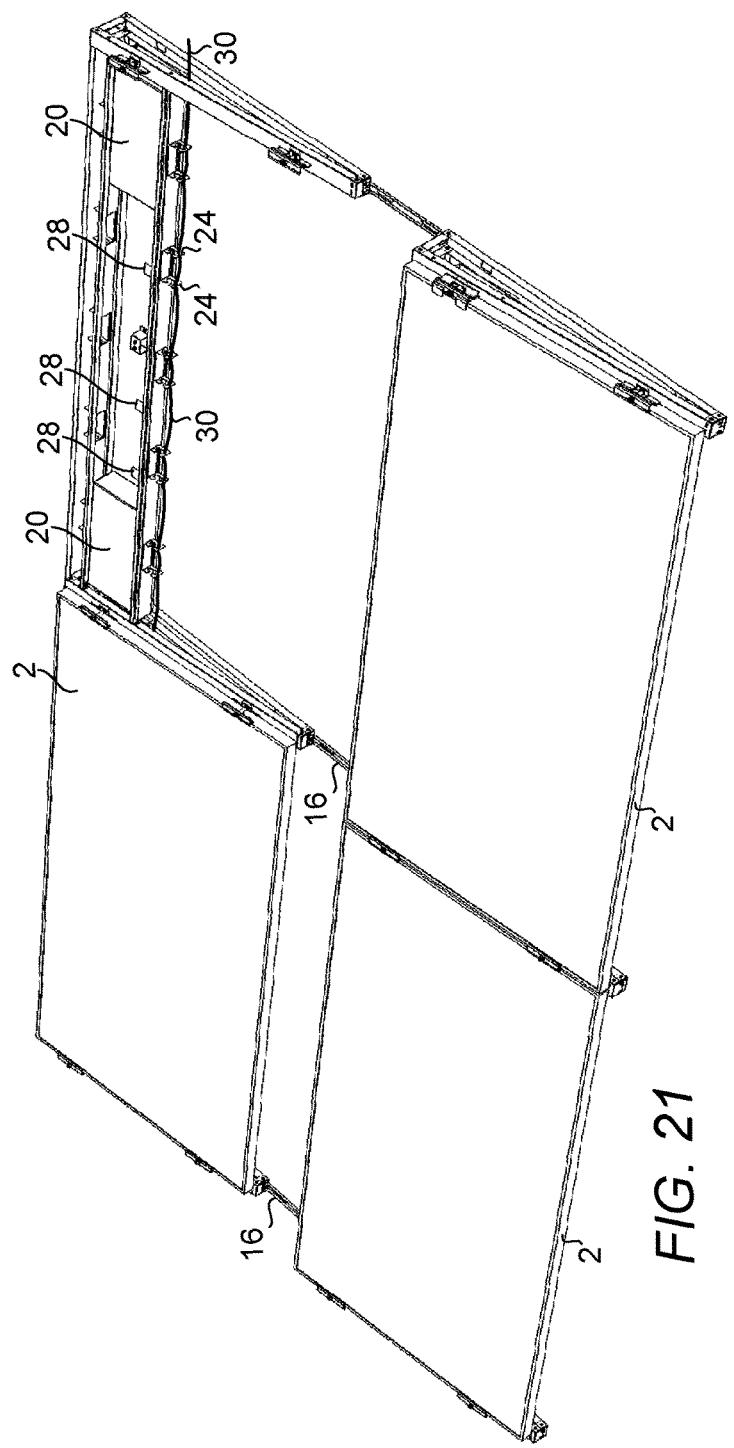
FIG. 21 is a top front perspective view of a panel support structure according to the present racking system with one solar panel removed to show a cable supported by cable hooks.
Figure 22:
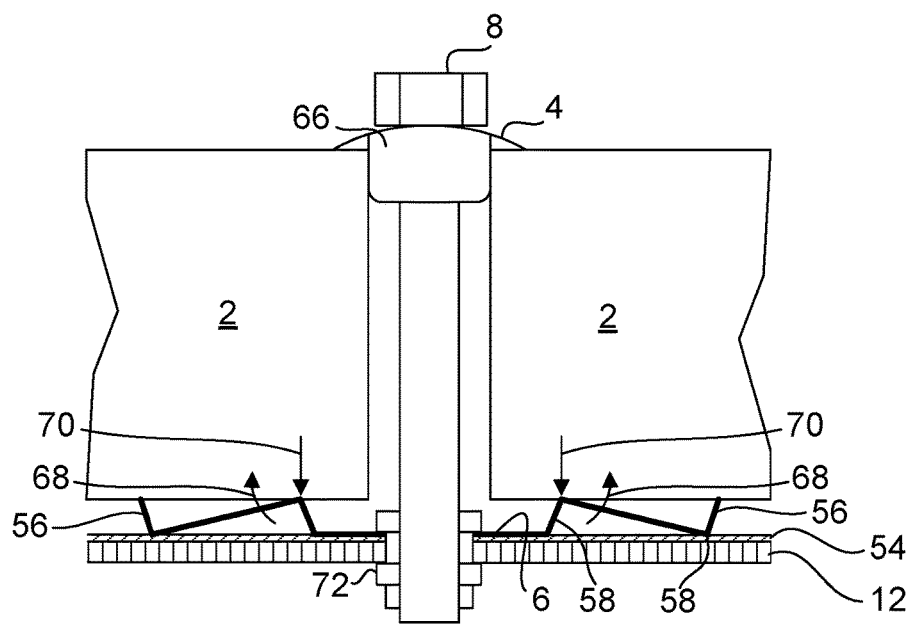
FIG. 22 is a diagram depicting a means by which grounding is effected between two solar panels and a support frame.

FIG. 7 is a bottom front close-up partial view of formed sheet metal tabs forming cable hooks 24. FIG. 8 is a side perspective view of the embodiment shown in FIG. 1 showing cable hooks 24. FIG. 9 is a top partial close-up perspective view of the embodiment shown in FIG. 1 showing cable hooks 24. FIG. 10 is a top close-up perspective view of a cable hook 24 in place on the present racking system. FIG. 11 is a top close-up perspective view of a cable hook 24 showing an embossed edge 26 to protect one or more held cables. FIG. 12 is a top view of the embodiment shown in FIG. 2. FIG. 13 is a top front perspective view of the present racking system without installed solar panels. FIG. 14 is a top close-up view of the grounding assembly employing grounding clips. FIG. 15 is a bottom front perspective view of the present racking system. FIG. 16 is a top front side perspective view of a panel support frame according to the present racking system showing grounding and retaining assemblies on an edge of a row of solar panels. FIG. 17 is a top front side perspective view of a solar panel support frame according to the present racking system showing grounding and retaining assemblies between two solar panels. FIG. 18 is a top front side perspective view of a panel support frame according to the present racking system showing grounding assemblies on an opposing edge from the edge shown in FIG. 16. FIG. 19 is a top rear side close-up perspective view of a panel support structure according to the present racking system showing grounding and retaining assemblies in place on a solar panel (upper portion of figure), and without a solar panel (lower portion of figure). FIG. 20 is a top side close-up perspective view of a grounding and retaining assembly in place on the edge of a solar panel. FIG. 21 is a top front perspective view of a panel support structure according to the present racking system with one solar panel removed to show a cable supported by cable hooks. FIG. 22 is a diagram depicting a means by which grounding is effected between two solar panels and a support frame.

Referring back to FIGS. 2-3, 7-11, 13, 15 and 21, it shall be apparent that the solar rack includes a plurality of cable hook 24. The cable hooks 24 are articulated as they are capable of assuming multiple configurations depending on the amount of bending applied to the cable hooks 24 from their as-fabricated state. The trough 18 includes two side walls. In the embodiment shown, the articulated cable hooks are constructed as part of the side walls of the trough 18, removing the need for a separately available substrate from which cables hooks are formed. In another embodiment, cable hooks may be disposed on an independent structure. In one embodiment, the cable hooks 24 are fabricated from a metal. The substrate from which cable hooks are fabricated is essentially a flat piece of material. In one embodiment, the cable hooks are fabricated from a sheet metal stamped in the shape of hooks. During installation of the solar rack, these hooks are bendable or foldable outwardly or in a direction that deviates from the plane within which these hooks lie during fabrication to a desired degree to form an opening 34. Slits 32 may be added along the base of these hooks to facilitate bending. The cable hooks 24 may be deployed during installation at required intervals to support and elevate one or more cables above the roof surface, thereby ensuring that the cables are free from debris that may collect on the roof surface. Note the offset 76 that the lowest point of the trough or base 74 makes with the bottom surface of the bottom member 14 in FIG. 7. Elevated cables are also free from standing water that may collect due to unevenness or undulation of a roof surface upon which the solar racks are disposed. Elevated and organized cables are also easier to identify should such activity be required during installation or repair of the cables.

Referring to FIG. 21, a cable 30 is shown supported by a series of cable hooks 24. It shall also be noted that each side wall of a trough 18 is provided with a series of cable hooks to facilitate management of cables as the use of cable hooks would not be limited to only one side of the trough 18. In some applications, cables of different purposes may also be run along a different series of cable hooks 24. Supported cables can fray due to the contact of sharp edges of the cable hooks with the cables. The weight of the cables and any relative movements of the cables (e.g., due to vibration) can further exacerbate the problem. In one embodiment, the cable hooks may be embossed to result in embossed edges 26 that are more "rounded" or "curved" to prevent cutting into and fraying of supported cables. In another embodiment, the sharp edges may be rubber-coated to remove the exposure of these sharp edges. In yet another embodiment, rubber grommets may also be used although the latter two options increase the number of materials used or increase the part count. In one embodiment, snapped-on "L"-shaped or "J"-shaped hooks may also be used. Holes may be provided on the side walls of the trough to allow the separately available hooks to be snapped onto or secured to the holes. Such hooks however increase the piece count as compared to the articulated cable hooks.

Referring back to FIGS. 3, 14, 16-18, 19-20 and 22, in one embodiment, each solar rack further includes a plurality of grounding clips 6 and a plurality of retaining clips 4. Each solar panel 2 is secured at its widthwise edges by two retaining clips 4 and grounded at four locations to two support frames. Each grounding clip 6 is essentially a rectangle-shaped electrical conductor having at least two banks of teeth 56 disposed on two of the total of four edges. Each bank of teeth 56 is configured to point upwardly. Referring to FIG. 22, each bank of teeth of a grounding clip 6 is disposed on a rotatable plate that is the result of two folds 58 made in the grounding clip 6. The engaging end of a stud 8 is placed though an aperture of a retaining clip 4 and then through an aperture of a grounding clip 6 before being removably engaged with a nut 72, e.g., a rivnut (or rivet nut), in a front member 10 of a support frame. During installation, the widthwise edge of a solar panel is placed within a space delineated by the retaining clip 4 on the top and a bank of teeth 56 of the grounding clip 6. The stud 8 may be advanced towards the front member 10 by tightening the stud at its head (e.g., by rotating the stud) against the front member 10, urging the retaining clip 4 against the widthwise edge of the solar panel 2 at the top and the bank of teeth 56 against widthwise edge of the solar panel 2 at the bottom. Each tab 66 aids in keeping two adjacent solar panels 2 apart at a fixed distance, therefore removing the need for installation crew to take measurements which increases installation time and effort. As tightening progresses, the widthwise edge of the solar panel also pushes the folds in direction 70 against the front member, causing a tendency for the rotatable plate to rotate in direction 68 such that the banks of teeth 56 will bite more deeply into (or in a direction closer to normal with respect to the bottom surface of) a bottom portion of the widthwise edge of the solar panel 2. Upon installation, as the grounding clip 6 comes in electrical contact with the front member 12 and the solar panel 2, the grounding clip 6 and the support frame are electrically now electrically connected. As all adjacently disposed solar panels are electrically tied together, no additional cables or wires are required for grounding, reducing the amount of cables (e.g., electrical and communication) that are required for the solar power system. Each bank of teeth is essentially a serrated edge capable of penetration into a second material against which it is pressed, causing electrical connection between the bank of teeth and the second material. As the solar panels are made electrically common, grounding of the entire solar power system can then be made by simply electrically connecting one of the solar panels with an electrical ground. FIG. 22 depicts a retaining clip 4 used for securing two adjacently placed solar panels 2. It shall be noted that the cap is configured in a manner capable of exerting a downward force against two solar panels when urged by the stud 8. In one embodiment, a brace 54 is further provided for each grounding clip 6, further improving electrical connection between a grounding clip 6 and a support frame. FIG. 21 depicts a retaining clip 4 configured in an "L" shape that is used for retaining an edge solar panel 2. Referring to FIGS. 16 and 21, in addition to a cap portion, this retaining clip 4 further includes a side portion which extends into two prongs 64 configured for insertion in two slits 32 disposed on a top surface of the front member 12, further securing the retaining clip 4 and hence the solar panel 2 against the front member 12.

Further disclosed are wind deflectors 22 configured for reducing the lifting effects of wind blowing directly into the rear portion of the racking system. Wind deflectors are essentially plates that are secured to and supported by rear members 10.

Support frames and troughs together, form the backbone of the present racking system. The present racking system is modular, and can accommodate any given number of solar panels, as desired. During installation, support frames, troughs 18, solar panels and other necessary components are transported to location. A desired location on a flat level surface is first obtained. An installer can proceed to set up a first desired row of the racking system by first erecting a support end at one end and then connecting one end of a trough to the support frame. A second support frame is then disposed at and secured to the second end of the trough. A second trough is then disposed with one of its ends at the second support frame and secured to the support frame. This process is then repeated for the desired number of solar panels. The modularity of the present racking system eliminates the need for customary measurements prior to installation.

Rows of the present racks may be constructed sequentially or simultaneously and connected using tie members 16. A support frame of a row of racks is preferably secured to a corresponding support frame of an adjacently disposed row of racks with a tie member to further secure the racking system. Ballasts 20 are then disposed in the troughs 18 to further weigh down the racking system. Retaining and grounding clips 4, 6 and studs 8 or the retaining and grounding assemblies may be placed and secured to the front members 12 of the support frames. Solar panels 2 may then be placed with their widthwise edges supported on the support frames between the retaining clips 4 on the top and grounding clips 6 on the bottom. The studs 8 are then tightened to press the retaining clips 4 down on the edges of the solar panels 2 and to cause the grounding clips 6 to bite into the solar panel edges.

Figure 23:
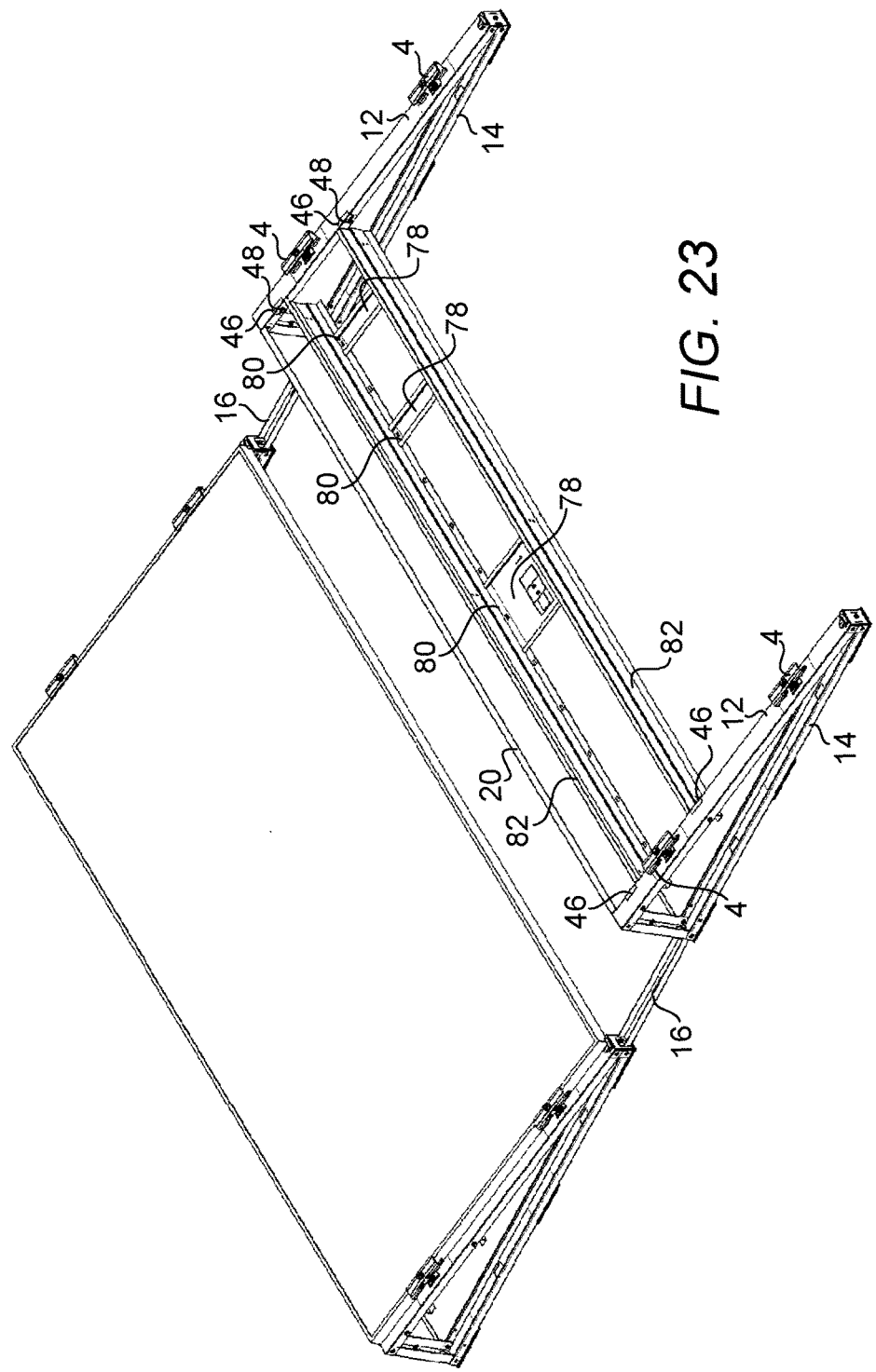
FIG. 23 is a top front perspective view of a panel support frame utilizing another embodiment of the present racking system.
Figure 24:
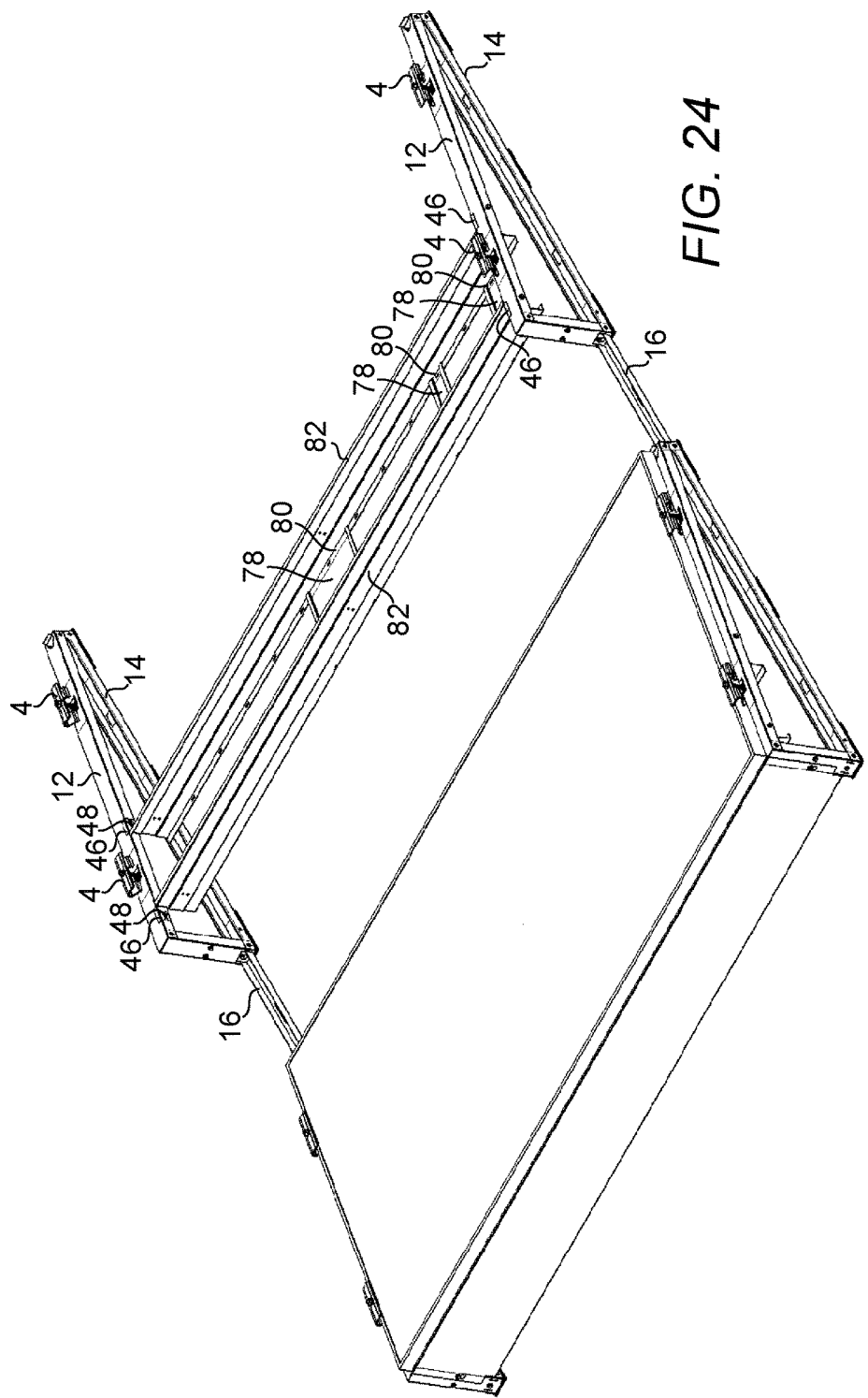
FIG. 24 is a top rear perspective view of a panel support frame utilizing another embodiment of the present racking system.

FIG. 23 is a top front perspective view of a panel support frame utilizing another embodiment of the present racking system. The solar panel of the front support frame is removed to reveal the structure underneath it. FIG. 24 is a top rear perspective view of a panel support frame utilizing another embodiment of the present racking system. The solar panel and wind deflector of the front support frame are removed to reveal the structure underneath it. It shall be noted that instead of a trough, the connecting structure is made of two elongated plates 82, each plate 82 having two ends and each end having a bracket 46 such that it can be secured using a fastener 48 to a support frame. Support members 78 are provided to further secure the two elongated plates 82 and to provide bases for supporting ballasts and electrical components. Each support member 78 has two edges 80, each edge is attached to an elongated plate 82. It shall be noted that, compared to a trough, the connecting structure shown in FIGS. 23 and 24 requires less materials and fewer manufacturing steps and therefore less costly to procure while still providing a structure that leaves one or more ballasts suspended such that the benefits associated with suspended ballasts can still be realized.

The detailed description refers to the accompanying drawings that show, by way of illustration, specific aspects and embodiments in which the present disclosed embodiments may be practiced. These embodiments are described in sufficient detail to enable those skilled in the art to practice aspects of the present invention. Other embodiments may be utilized, and changes may be made without departing from the scope of the disclosed embodiments. The various embodiments can be combined with one or more other embodiments to form new embodiments. The detailed description is, therefore, not to be taken in a limiting sense, and the scope of the present invention is defined only by the appended claims, with the full scope of equivalents to which they may be entitled. It will be appreciated by those of ordinary skill in the art that any arrangement that is calculated to achieve the same purpose may be substituted for the specific embodiments shown. This application is intended to cover any adaptations or variations of embodiments of the present invention. It is to be understood that the above description is intended to be illustrative, and not restrictive, and that the phraseology or terminology employed herein is for the purpose of description and not of limitation. Combinations of the above embodiments and other embodiments will be apparent to those of skill in the art upon studying the above description. The scope of the present disclosed embodiments includes any other applications in which embodiments of the above structures and fabrication methods are used. The scope of the embodiments should be determined with reference to the appended claims, along with the full scope of equivalents to which such claims are entitled.

What is claimed herein is:

1. A solar rack for supporting a solar panel, said solar rack comprising:
    (a) a pair of support frames, each said support frame comprising a front member, a bottom member, and a rear member, wherein said front member, said bottom member, and said rear member cooperate to form a triangularly shaped structure;
    (b) a trough comprising two ends and a base, each end of said trough is configured to be attached to a portion of each said support frame to form a support upon which the solar panel is disposed, wherein said base of said trough is configured to be offset in height with respect to said bottom members and said base is configured to receive a ballast to further secure said solar rack upon a surface said solar rack is disposed; and
    (c) at least one articulated cable hook formed in said trough, said at least one articulated cable hook comprising a hook connected to said trough at a neck portion, and at least one slit disposed at said neck portion, wherein said at least one slit facilitates bending of said hook with respect to said trough and said at least one articulated cable hook is configured to support cables functionally connected to the solar panel.

2. The solar rack of claim 1, wherein said at least one articulated cable hook comprises at least one embossed edge.

3. The solar rack of claim 1, wherein said trough further comprises at least one side wall and said at least one articulated cable hook is formed in said at least one side wall.

4. The solar rack of claim 1, further comprising at least one grounding clip, said at least one grounding clip is configured to electrically connect at least one support frame of said pair of support frames, and the solar panel.

5. The solar rack of claim 1, further comprising a retaining clip and a stud, wherein said stud having a first end configured to allow tightening of said stud and a second end configured to be removably engaged to one of said support frames such that the solar panel can be securely supported by said pair of support frames when said stud is tightened by twisting said first end of said stud.

6. A solar rack for supporting a solar panel, said solar rack comprising:
    (a) a pair of support frames, each said support frame comprising a front member, a bottom member, and a rear member, wherein said front member, said bottom member, and said rear member cooperate to form a triangularly shaped structure disposed;
    (b) a connecting structure comprising two ends and a base, each end of said connecting structure is configured to be attached to a portion of each said support frame to form a support upon which the solar panel is disposed, said support having bottom surfaces, wherein said base of said connecting structure is configured to be offset in height with respect to said bottom surfaces and said base is configured to receive a ballast to further secure said solar rack upon a surface said solar rack is disposed; and
    (c) at least one articulated cable hook formed in said connecting structure, said at least one articulated cable hook comprising a hook connected to said connecting structure at a neck portion, and at least one slit disposed at said neck portion, wherein said at least one slit facilitates bending of said hook with respect to said connecting structure and said at least one articulated cable hook is configured to support cables functionally connected to the solar panel.

7. The solar rack of claim 6, wherein said at least one articulated cable hook is formed in a wall of said connecting structure.

8. The solar rack of claim 6, wherein said at least one articulated cable hook comprises at least one embossed edge.

9. The solar rack of claim 6, further comprising at least one grounding clip, said at least one grounding clip is configured to electrically connect at least one of said support frames, and the solar panel.

10. The solar rack of claim 6, further comprising a retaining clip and a stud, wherein said stud having a first end configured to allow tightening of said stud and a second end configured to be removably engaged to one of said support frames such that the solar panel can be securely supported by said pair of support frames when said stud is tightened by twisting said first end of said stud.

11. The solar rack of claim 6, wherein said connecting structure comprises a trough.

12. The solar rack of claim 6, wherein said connecting structure comprises a pair of elongated plates.

* * * * *